UNITED STATES PATENT OFFICE 2,510,935

PRODUCTION OF THERMOSETTING SYNTHETIC RESINS

John Kenson Simons, Toledo, Ohio, assignor to Libbey-Owens-Ford Glass Company, Toledo, Ohio, a corporation of Ohio No Drawing. Application June 28, 1944, Serial No. 542,615

3 Claims. (Cl. 260—67.5)

The invention relates to the production of novel thermosetting synthetic resins.

Nearly all the known resins formed by the reaction of formaldehyde with various compounds are without practical value because of undesirable physical properties. Most of them are thermoplastic or so slowly thermosetting that they may be regarded for all practical purposes as thermoplastic. Formaldehyde reacts with certain nitrogenous compounds, such as urea, to form thermosetting resins, but the resins so produced have one outstanding disadvantage, which is relatively low water resistance.

The principal object of the invention is the production of a novel thermosetting resin having superior water resistance by reaction of formaldehyde with a nitrogenous compound. More specific objects and advantages are apparent from the description which merely discloses and illustrates the invention and is not intended to impose limitations upon the claims.

The present invention is based upon the discovery that 2,5-diamino-1,3,4-thiodiazole

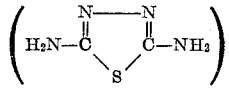

reacts with formaldehyde to form a thermosetting resin which in its infusible, insoluble stage has outstanding water resistance.

In the practice of the present invention diaminothiodiazole may be reacted either with formaldehyde or with a polymer thereof, such as paraformaldehyde. When used for this reaction, paraformaldehyde is considered to split up so that the substance actually taking part in the reaction with the diaminothiodiazole is formaldehyde. Preferably the diaminothiodiazole is reacted with a solution of formaldehyde in water, in an organic solvent such as an alcohol, or in a liquid containing both water and an organic solvent.

When a formaldehyde solution is used for the reaction with diaminothiodiazole, the solution is preferably about neutral at the start of the reaction, although the reaction may be carried out in an acid or alkaline solution. Since commercial aqueous formaldehyde solution is strongly acid, a base is preferably added to bring the initial pH of the reaction solution to the desired value. Any desired base may be employed.

The proportion of formaldehyde actually reacting with each mol of diaminothiodiazole may be from one to two mols, and the proportion reacting may vary freely between these limits because of the complexity of the molecules of the reaction product that is produced. An excess of either reactant beyond these proportions may be used if desired, although an uncombinable excess of one of the reactants usually is not desirable in the final product.

The reaction proceeds at ordinary temperatures, but is expedited by heating. An intermediate reaction product may be prepared by carrying the reaction only to its earliest stage, for example, the stage at which the reactants have just formed a common solution, or the reaction or condensation may be carried to any further stage (short of the final infusible resinous stage) at which the product may still be called an intermediate reaction product. By thus advancing the reaction, it is possible to obtain an intermediate reaction product that is insoluble but still fusible. For many purposes it is convenient to allow the soluble type of intermediate reaction product to remain in the form of a solution. Such a solution, after the addition of any desired ingredients, may be used as a binder in the production of impregnated or laminated products, as an adhesive, as a dressing or creaseproofing agent for textiles, as a paper-treating agent, as an ingredient for coating compositions, as a flame-proofing agent for wood, and as a composition to be converted into a foam that can be hardened to produce an insulating material.

An intermediate reaction product may be obtained in dry form from a solution by evaporating or diluting it with water, to adjust its concentration to the proper value, and then spray-drying or vacuum drum-drying. It usually is more convenient to ship or store an intermediate reaction product in dry form than in the form of a solution. Various ingredients, such as fillers, pigments and hardening catalysts, may be mixed with a dry intermediate reaction product so that a coating composition, adhesive, binder or impregnating agent may be obtained simply by adding water or other solvent to the dry mixture.

An acid catalyst may be used in hardening or converting the intermediate reaction product into an infusible resin. Since the action of such a catalyst is due solely to its acidity, any acid substance, such as an inorganic acid, an organic acid or an acid salt such as ammonium chloride or sulfate, may be used as the catalyst. The acidity may be furnished by mere addition of an acid substance to the intermediate reaction product, but acidity to catalyze the conversion of the intermediate reaction product to an infusible resin preferably is provided by incorporating a potential acid catalyst with the intermediate reaction product. A potential acid catalyst is a substance, which, after being added to the intermediate reaction product, remains substantially neutral so long as the reaction product is stored at ordinary temperatures, but decomposes or reacts to generate acidity when the intermediate reaction product is heated in the operation of converting it into an infusible resin. The degree of acidity employed during the hardening of the intermediate reaction product is simply that acidity which causes the intermediate reaction product to harden at the desired rate.

Fillers, plasticizers, hot-plate lubricants, opacifiers, dye stuffs, pigments and other coloring matter may be incorporated with the intermediate reaction product to produce a suitable molding composition. In the prefered method of preparing a molding composition, the filler is impregnated with a solution of a soluble intermediate reaction product, and the solvent is then removed. Fibrous cellulosic material in the form of paper pulp, wood flour or the like preferably is employed as the filler. Heat may be used to facilitate the drying of the impregnated cellulose or other filler. Of course, the drying temperature should not be sufficient to render the molding composition infusible. After the water or other solvent has been removed, the dry product may be ground in a ball mill to produce a homogeneous powder, and modifiers, such as plasticizers, lubricants and pigments, may be incorporated in the grinding operation. If desired, the powder may be compressed into blanks or preforms of the proper sizes for use in various molds. The molding composition may be employed in the usual manner for the production of molded articles by compressing it in a closed mold under a pressure of one to four tons per square inch of projected area and at a temperature between 100° C. and 200° C., preferably about 140°–150° C., for a period of one to five minutes.

The preferred filler is alpha cellulose pulp, which is a very pure, white form of cellulose. A given weight of alpha cellulose may be impregnated with a solution obtained by dissolving approximately the same weight of diaminothiodiazole in a commercial 37 per cent aqueous solution of formaldehyde that contains about 2½ mols of formaldehyde for each mol of diaminothiodiazole. The solution may contain a sufficient quantity of a base, such as triethanolamine, so that it has a pH of about 7. Alpha cellulose so impregnated may be dried by exposure to air at 125° F. for 45 minutes. When ground to a powder in a ball mill and hot-molded under ordinary commercial molding conditions, this dried product produces articles which, when immersed in boiling water for 15 minutes, undergo no change in appearance, and absorb only 15 per cent or less of the amount of moisture that is absorbed under the same conditions by articles molded from a standard commercial urea-formaldehyde molding composition.

Articles of infusible resin embodying the invention may be produced by methods other than preparing and hot-pressing a molding composition, for example, by casting in open molds and baking. The intermediate reaction products that have been described can be incorporated with a great variety of other resins or potential resins. Also, reaction products of formaldehyde with mixtures of diaminothiodiazole with other substances can be produced. The intermediate reaction products in the resulting compositions may then be converted into the infusible resins, and a blend or copolymer of different resins may thus be obtained.

Various embodiments of the invention may be devised to meet various requirements.

Having described my invention, I claim:

1. A method of producing a synthetic resin that comprises reacting formaldehyde with 2,5-diamino-1,3,4-thiodiazole.

2. An intermediate reaction product of formaldehyde with 2,5-diamino-1,3,4-thiodiazole, capable of conversion into an infusible resin.

3. A resinous reaction product of formaldehyde with 2,5-diamino-1,3,4-thiodiazole.

JOHN KENSON SIMONS.

REFERENCES CITED

The following references are of record in the file of this patent:

UNITED STATES PATENTS

| Number | Name | Date |
| --- | --- | --- |
| 2,306,924 | Zerweck | Dec. 29, 1942 |
| 2,320,820 | D'Alelio | June 1, 1943 |

FOREIGN PATENTS

| Number | Country | Date |
| --- | --- | --- |
| 105,760 | Australia | Nov. 24, 1938 |

OTHER REFERENCES

Zerweck A. P. C., 314,449, Apr. 20, 1943.
Beilstein Hanbuch der Organische Chemie, 4th edition, vol. 27, page 667.